(12) United States Patent
Guth et al.

(10) Patent No.: US 7,517,435 B2
(45) Date of Patent: Apr. 14, 2009

(54) PROCESS FOR THE REMOVAL OF MERCURY FROM SOLUTIONS CONTAMINATED WITH MERCURY

(75) Inventors: Josef Guth, Freinsheim (DE); Holger Friedrich, Bobenheim-Roxheim (DE); Hans-Jürgen Bender, Freinsheim (DE); Dieter Schlafer, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 690 days.

(21) Appl. No.: 10/536,011

(22) PCT Filed: Nov. 17, 2003

(86) PCT No.: PCT/EP03/12818

§ 371 (c)(1),
(2), (4) Date: May 23, 2005

(87) PCT Pub. No.: WO2004/048625

PCT Pub. Date: Jun. 10, 2004

(65) Prior Publication Data

US 2006/0076228 A1    Apr. 13, 2006

(30) Foreign Application Priority Data

Nov. 26, 2002 (DE) ................................ 102 55 239

(51) Int. Cl.
*B01D 3/34* (2006.01)
*B01D 21/00* (2006.01)
*C22B 43/00* (2006.01)

(52) U.S. Cl. ............................ 203/47; 75/742; 203/12; 203/100; 210/914

(58) Field of Classification Search .................. 75/742; 203/12, 47, 36–38, 100; 210/774, 806, 914
See application file for complete search history.

(56) References Cited

U.S. PATENT DOCUMENTS

| 3,814,799 | A |   | 6/1974  | Wygasch |
|-----------|---|---|---------|---------|
| 3,857,704 | A | * | 12/1974 | Coulter ........................ 75/721 |
| 4,093,541 | A |   | 6/1978  | Piccinini et al. |
| 4,230,486 | A |   | 10/1980 | Capuano et al. |
| 5,031,883 | A | * | 7/1991  | Grossman et al. ........... 266/148 |
| 5,080,799 | A |   | 1/1992  | Yan |
| 5,391,217 | A |   | 2/1995  | Zoche |
| 6,156,214 | A |   | 12/2000 | Bongen et al. |
| 7,332,090 | B2 | * | 2/2008 | Bender et al. ................ 210/688 |

FOREIGN PATENT DOCUMENTS

| DE | 404928 | 10/1924 |
| DE | 2102039 | 7/1972 |
| DE | 26 43 478 A1 | 4/1977 |
| DE | 41 16 890 A1 | 11/1991 |
| DE | 42 21 205 A1 | 1/1994 |
| DE | 42 21 206 A1 | 1/1994 |
| DE | 42 21 207 A1 | 1/1994 |
| DE | 197 04 889 A1 | 8/1998 |
| EP | 0 761 830 A2 | 3/1997 |
| GB | 465 757 | 5/1937 |
| GB | 1 530 489 | 11/1978 |

OTHER PUBLICATIONS

Isfort, "Moderne Alkalichlorid-Elektrolyse nach dem Hg-Verfahren," *Chemie und Wirtschaftlichkeit*, pp. 65-69 (Sep. 1972).

* cited by examiner

*Primary Examiner*—Virginia Manoharan
(74) *Attorney, Agent, or Firm*—Connolly Bove Lodge & Hutz LLP

(57) ABSTRACT

Mercury is removed from solutions contaminated with mercury, the solution contaminated with mercury being introduced into a distillation column above the column bottom, solvent being distilled off and solution depleted in mercury being stripped off at the column bottom.

4 Claims, No Drawings

PROCESS FOR THE REMOVAL OF MERCURY FROM SOLUTIONS CONTAMINATED WITH MERCURY

The present invention relates to a process for the removal of mercury from liquids. In particular, the invention relates to a process for the removal of mercury from solutions, especially a process for the removal of mercury from the solutions formed in the decomposition of alkali metal amalgam by water or alcohols, especially aqueous alkali metal hydroxide solution or alcoholic alkali metal alkoxide solution.

In some chemical processes, mercury-containing liquids are obtained. On account of its toxicity, mercury is usually an undesired impurity and must therefore customarily be removed. For example, in alkali metal chloride electrolysis according to the amalgam process chlorine and an alkali metal amalgam are produced. This alkali metal amalgam is decomposed with addition of water or alcohol to obtain the products alkali metal hydroxide or alkali metal alkoxide, which are important and produced in large amounts, the mercury being released again and fed back into the electrolysis. The aqueous solution of alkali metal hydroxide (customarily named "alkali solution", especially named "sodium hydroxide solution", an aqueous sodium hydroxide solution and "potassium hydroxide solution", an aqueous potassium hydroxide solution) or alcoholic solution of alkali metal alkoxide produced in the amalgam decomposition contains mercury, however, always in small amounts, typically in a range from 10 to 50 ppm ("parts per million", i.e. milligrams per kilogram. In the context of this invention the data represent ppm or ppb, "parts per billion", i.e. micrograms per kilogram, always mass ratios). Under certain circumstances, this mercury content can also achieve values of above 100 ppm. This amount of mercury is not tolerable for most applications of alkali metal hydroxides or alkali metal alkoxides and must be lowered by a process for mercury removal ("demercurization"). Values of at most a few ppb are desired here, ideally at most 3 ppb, the mercury content is thus to be lowered by a factor of approximately $10^4$.

The mercury is customarily present at least partly in the form of mercury metal, which is usually dispersed in the liquid in the form of very fine droplets or—below the solubility limit—dissolved.

Various processes for the removal of mercury from product streams are already known, also in connection with alkali metal amalgam cleavage.

EP 761 830 A2 discloses a very simple, purely mechanical process, in which finely divided mercury is collected in liquids by coalescence in the form of easily separable relatively large mercury drops. Using this process, a mercury depletion by a factor of at least 10 is possible, but not down to the lower ppb range.

Often, the formation of solid amalgams is used for mercury removal. The metals best suited for this are those of the 11th group of the Periodic Table of the Elements, which are usually employed in the form of an absorption mass, in which the metal is dispersed on a support. Thus DE 21 02 039 discloses a process for the removal of mercury from gases such as the hydrogen formed in the preparation of alkali metal hydroxide by cleavage of alkali metal amalgam with water, in which the gases contaminated with mercury are brought into contact with copper on a porous aluminum oxide support and thus freed of mercury. U.S. Pat. No. 4,230,486 discloses a process for the removal of mercury from liquids by passing over a metallic silver on an absorbing agent comprising porous support. DE 42 21 207 A1 describes a process for the removal of mercury from liquids such as alkali solutions or alkali metal alkoxide solutions by passing over fibers coated with silver. DE 42 21 205 A1 and DE 42 21 206 disclose processes for the working up of such fibers according to their intended use. DE 41 16 890 discloses a number of absorbing agents for mercury removal, which contain certain metals, in particular Cu, Ag, Fe, Bi, but also Au, Sn, Zn and Pd, and mixtures of the metals mentioned, in metallic or oxide form or as a sulfide on a support material. These processes do make possible a depletion of mercury down to the range of a few ppb, but the absorption masses used are usually regenerable only with very great difficulty, their absorption capacity is rapidly exhausted and they are comparatively expensive due to the considerable content of noble metals necessary.

The use of activated carbon having a specific surface area of at least 250 $m^2/g$ for the removal of mercury from liquids by absorption is known from DE 26 43 478. The use of activated carbon settling filters for mercury removal from sodium hydroxide solution, potassium hydroxide solution or alkoxide solutions is industrially customary, as described by Isfort, Chemie Anlagen und Verfahren ("CAV"), September 1972, pages 65-69. The comparatively simple activated carbon treatment, however, also does not lead to satisfactory results in all cases. In particular, to achieve the desired low mercury values a very fine-grain powder of a high-surface-area activated carbon must be used. Especially in the filtration of alkoxide solutions, in which (in contrast to aqueous solutions) very finely divided suspensions form due to side reactions with the alcohol or cleavage of the alkoxide, the activated carbon filters are stopped very rapidly by deposits of these suspensions, so that only an unsatisfactory service life of the filter is achieved, which makes activated carbon treatment economically unsatisfactory. DE 197 04 889 discloses as a remedy a three-stage process for the demercurization of alkali metal alkoxide solutions, in which in a first stage the solution is led through inert fiber material in order thus to separate off the finely divided suspensions and as a side effect to lower the mercury content by a factor of approximately 10. The solution is filtered in a second stage through a customary activated carbon filter having a high-surface-area and finely divided activated carbon, which lowers the mercury content in turn by a factor of approximately 10. In a third stage, a distillative concentration of the alkoxide is carried out, i.e. the solution is concentrated by evaporation of the alcohol and the desired alkoxide concentration is thus established by the alkoxide solution being present in a distillation still and alcohol being distilled off through a packed column. The mercury concentration here again falls by a factor of approximately 10. All in all, using the process described mercury contents of 28 to 50 ppb are achieved. With this process too, the desired mercury contents of at most 3 ppb, however, cannot be achieved.

The object of the present invention is therefore to find a simple and economically satisfactory process with which the mercury contents in liquids, in particular in alkali solutions, but also in alkali metal alkoxide solutions, can be lowered to values of at most 3 ppb.

Accordingly, a process for the removal of mercury from solutions by distillation has been found, which comprises introducing the solution contaminated with mercury into a distillation column above the column bottom, distilling off solvent and stripping off solution depleted in mercury at the column bottom.

Surprisingly, it has now been found that by using this process considerably better degrees of depletion of mercury are achieved than by using known processes or process steps. Mercury can be depleted by a factor of more than 100 using the very simple distillative process according to the invention.

The process according to the invention is in particular suitable for the depletion of mercury in alkali solutions and also in alkali metal alkoxide solutions and can be combined with other purification processes or process steps in order to achieve higher degrees of depletion of mercury. Repeated carrying out of the distillative purification process according to the invention also brings about a correspondingly higher mercury depletion.

The solution to be purified is introduced into the column above the column bottom, i.e. in plate columns at least at the height of the lowest distillation plate or in packed columns at least at the height of the lowest (first) theoretical plate. The fixing of the supply positions is a simple routine task in the course of the technical engineering design of the column. Preferably, the solution is introduced into the column at the column top.

The solution depleted in mercury is stripped off at the column bottom. This means that the solution is removed from the column at the lower end of the column, i.e. below the actual distillation structure in which the gas/liquid exchange characterizing a distillation takes place. This can be both the actual bottom, i.e. the lower end of the column itself, which is usually filled with liquid, and a liquid collector or distillation receiver ("distillation still") connected thereto.

Preferably, the process according to the invention is employed for the removal of mercury from alkali solutions or alkali metal alkoxide solutions, in particular those alkali solutions or alkali metal alkoxide solutions which are produced by decomposition of alkali metal amalgam with water or alcohol. The preparation of alkali metal amalgam and its decomposition with water or alcohol, uncatalyzed or using catalysts, are known technologies. As an alkali, lithium, sodium, potassium, rubidium or cesium is employed, preferably sodium or potassium. By decomposition of sodium or potassium amalgam with water sodium hydroxide solution or potassium hydroxide solution is formed. By decomposition of sodium or potassium amalgam with alcohol, a solution of the corresponding sodium alkoxide or potassium alkoxide in the corresponding alcohol is formed. The solution or the alkoxide solution are in this case always, as described above, contaminated with mercury, which is removed completely or largely using the process according to the invention.

As an alcohol for the production of an alkali metal alkoxide solution to be treated using the process according to the invention, any desired alcohol can be employed. Preferably, a substituted or unsubstituted aliphatic, alicyclic, aromatic, arylaliphatic, arylalicyclic, cycloalkyl aromatic or alkyl aromatic alcohol is used. In particular, the straight-chain or branched aliphatic alcohols having 1 to 6 carbon atoms are used, such as methanol, ethanol, 1-propanol ("n-propanol"), 2-propanol ("isopropanol"), 1-butanol ("n-butanol"), 2-butanol ("isobutanol"), 2-methyl-1-propanol ("sec-butanol"), 1,1-dimethyl-1-ethanol ("tert-butanol"), or the individual isomeric C5- or C6-alcohols. The use of methanol or ethanol is particularly preferred.

By decomposition of sodium amalgam or potassium amalgam with methanol or ethanol, a solution of sodium methoxide or potassium methoxide in methanol or a solution of sodium ethoxide or potassium ethoxide in ethanol is produced, which is then subjected to the process according to the invention.

The concentration of the solution employed in the process according to the invention—i.e., for example, the alkali solution or alkali metal alkoxide solution prepared by alkali metal amalgam decomposition with water or alcohol, can be varied within wide ranges, it is not crucial for the present invention. The concentration of the solution contaminated with mercury and the amount of solvent distilled off are adjusted such that a solution of the desired concentration and of the desired maximum mercury content is drawn off at the column bottom.

Usually, the concentration is fixed or decisively influenced by the preparation conditions of the solutions, in the case of the alkali metal amalgam decomposition, for example, by the amount of alcohol or water employed for the decomposition and by the alkali metal content of the amalgam. Therefore specific concentrations of the solution to be purified are usually technically customary, and often subsequent processes are designed to these customary concentrations of their employed substances. The solution freed of mercury using the process according to the invention can then be diluted or concentrated without problems and thus brought to the desired concentration. However, it is an advantage of the distillation process according to the invention that by the choice of the concentration of the solution introduced into the column and the amount of solvent distilled off a solution of the desired concentration can be drawn off at the column bottom. In a preferred embodiment of the process according to the invention, the amount of solvent which is distilled off is added to the solution before or during the distillation as an additional solvent and thus the original starting concentration of the solution treated is maintained. This can be carried out by dilution of the solution before the distillation, but also by simultaneous introduction of solution and solvent into the distillation column. In this manner, the concentration of the solution resulting during the customary preparation of the solution and therefore technically also customary is maintained and only its mercury content is lowered.

Provided exclusively the distillation process according to the invention is used for the mercury separation, the concentration of the solution, for example of the alkali solution or alkoxide solution is virtually unimportant, a mash can also be used, that is a liquor or solution above the saturation concentration of the dissolved substance, i.e. having a content of undissolved matter. In the extreme case, solid contaminated with mercury, for example sodium hydroxide or potassium hydroxide, sodium methoxide or potassium methoxide or sodium ethoxide or potassium ethoxide could also be introduced into the distillation column dry, but this is technically more difficult than the introduction of a pumpable solution or mash. The use of a pumpable solution or mash is therefore preferred. Provided solid is introduced into the column, an amount of additional solvent sufficient for its dissolution is also introduced.

If, before the distillation according to the invention, further purification steps are carried out, the concentration used is also to be adjusted according to the requirements of these purification steps. If, for example, filtration steps are additionally carried out, quite obviously the use of mashes offers itself.

In the purification of sodium hydroxide solution or potassium hydroxide solution, in general a concentration of at least 10% by weight, preferably at least 15% by weight, in a particularly preferred manner at least 20% by weight and in general at most 70% by weight, preferably at most 65% by weight and in a particularly preferred manner at most 60% by weight of sodium hydroxide or potassium hydroxide in water is adjusted. In the purification of sodium methoxide or potassium methoxide, in general a concentration of at least 20% by weight, in a preferred manner at least 25% by weight and in a particularly preferred manner at least 27% by weight, and in general at most 40% by weight, in a preferred manner at most 32% by weight and in a particularly preferred manner at most 31% by weight of sodium methoxide or potassium methoxide in methanol is adjusted. In the purification of sodium ethoxide or potassium ethoxide, in general a concentration of at least 10% by weight, in a preferred manner at least 15% by weight and in a particularly preferred manner at least 16% by weight, and in general at most 30% by weight, in a preferred manner at most 22% by weight and in a particularly preferred manner at most 20% by weight of sodium ethoxide or potassium ethoxide in ethanol is adjusted.

Provided additional solvent is added to the solution before or during the distillation, an additional solvent is used which has at most the same boiling point as the solvent of the solution contaminated with mercury. In other words, the additional solvent used can be a solvent that has a lower boiling point than the solvent of the solution contaminated with mercury. Preferably, however, the solvent of the solution contaminated with mercury is also used as an additional solvent. For the removal of mercury from liquors such as sodium hydroxide solution or potassium hydroxide solution, water is thus preferably used as an additional solvent, for the removal of mercury from methanolic solutions of sodium methoxide or potassium methoxide and for the removal of mercury from ethanolic solutions of sodium ethoxide or potassium ethoxide ethanol is preferably used.

The ratio of solution contaminated with mercury and additional solvent and the amount of solvent distilled off are chosen such that on the one hand the desired final concentration of the purified solution is achieved and on the other hand the desired mercury depletion is achieved. Typically, a ratio of solution to additional solvent of in general at least 30:1, in a preferred manner at least 20:1 and in a particularly preferred manner at least 10:3, and in general at most 1:3, in a preferred manner 1:2 and in a particularly preferred manner at most 4:1, is adjusted. The amount of solvent distilled off is then chosen such that the desired final concentration of the purified solution is achieved.

The additional solvent is introduced either at the same position in the column as the solution to be purified or in a position in the column different therefrom, for example at the column bottom, at a level between the bottom and column top or at the column top. Conveniently, the additional solvent is passed into the column at the same position as the solution to be purified.

The pressure and temperature during the distillation are chosen according to the outline conditions present (for example according to the heating media present at the site of the column), this is a routine task. Typically, the pressure and temperature are chosen in a technically customary manner as in the distillation of the solvent concerned. In the distillation of water, methanol or ethanol, normal pressure is often set and the mixture is distilled at the corresponding boiling point under normal pressure.

Mercury is separated off as a liquid phase from the solvent removed by distillation and disposed of or preferably fed back into the preparation of amalgam again. The solvent removed by distillation is purified again or disposed of. It can also be fed back into the column again.

Provided it is the same solvent as that in the solution contaminated with mercury, it is preferably used for the preparation of the solution. In the preparation of alkali solution or alkali metal alkoxide solutions, the water removed by distillation or the alcohol removed by distillation is thus preferably fed back into the amalgam decomposer. In this case, a prior separation of mercury is usually unnecessary, mercury contained in the solvent is then fed back into the mercury circulation of amalgam preparation and decomposition in the decomposer. However, it may be advisable—as virtually always in recycling of substance streams—to exclude and to dispose of one part stream of the recycled solvent stream in order to prevent or to restrict an increase in the level of impurities (mercury and/or possible other impurities).

The embodiment of the distillation column used is not crucial for the invention and can take place according to essentially economic considerations, the separation efficiency required for the removal of the solvent by distillation must, however, be given. The design of such columns is prior art. It is possible to use, for example, plate columns or packed columns. The use of plate columns is preferred because of the simpler assembly of the distillation structure. Any known construction form of column plates can be used, for example bubble-cap plates, tunnel plates or valve plates.

The mercury depletion process according to the invention can be combined with any other known purification process to give an overall process in order also to combine the depletion action of the various process steps of the overall process. For example, the combination of the process according to the invention with a further process using which mercury is depleted by the factor 10 gives an overall depletion by a factor of approximately $10^3$, and the combination with two further processes using which mercury can in each case be depleted by a factor of 10 gives an overall depletion by the factor $10^4$. The sequence of carrying out the individual process steps of the overall process can basically be chosen freely. In general, it is advantageous first to carry out process steps which are suitable mainly for the removal of relatively large amounts of mercury, in order only to carry out the final fine purification using the process according to the invention, without leading comparatively high amounts of mercury into the distillation column. For example, it is advisable to carry out mechanical processes such as, for example, the coalescence of mercury droplets to give larger droplets before the distillation process according to the invention. If, taking into account their disadvantages, absorbing agents based on amalgamating noble metals are additionally also employed, they are preferably used after the distillation according to the invention in order thus to optimally utilize their high purification effect with, however, low absorption capacity. The distillative process according to the invention makes, however, the use of such absorbing agents unnecessary, at best with the exception of some special cases with extreme purity requirements.

In a preferred embodiment of the distillation process according to the invention for the purification, in particular, of alkali solutions or alkali metal alkoxide solutions, before or after, but preferably before, the distillation a filtration through carbon is carried out. For this filtration step, any of the known activated carbon filtration processes for solutions of this type can be used. One of the advantages of the process according to the invention is that for a preinserted carbon filtration step the use of a comparatively coarse carbon is sufficient and thus the blocking problems due to fine suspensions in the alkoxide solutions is avoided. Typically, for a carbon filtration step a carbon having an average particle size of in general at least 10 micrometers, preferably at least 20 micrometers, and at most 1000 micrometers, preferably at most 500 micrometers, is used. The BET surface area of such carbons is in general at least 0.2 $m^2/g$, preferably at least 0.5 $m^2/g$, and in general at most 1000 $m^2/g$, preferably at most 10 $m^2/g$. Electrode graphite, for example, is highly suitable. A preferred electrode graphite has a surface area of about 1 $m^2/g$. In a customary manner, the solution contaminated with mercury is filtered through a carbon filter which is at least 0.5 mm, preferably 1 mm, and at most 30, preferably at most 10, mm thick. For this, any filter construction can be employed in which an appropriate carbon filter layer can be deposited, for example flat filters, disk filters, candle filters, plate filters, suction filters, edge filters or plastic cord filter candles. The use of edge filters is preferred, onto which carbon is deposited in the form of a suspension in the solvent used. This is well known prior art.

Furthermore, the distillation process according to the invention can be combined with a filtration step using fiber materials. These filtration processes are also known. Typically, inert fibers are used, for example fibers of polyethylene, polypropylene, polystyrene, polytetrafluoroethylene, cellulose, mineral fibers such as glass wool or rock wool, or mixtures of such fibers. The fibers are customarily pressed to give a flat structure and alternatively also sintered and provided with a binder, filler and/or additive or a supporting fabric. These nonwoven mats contain open channels or pores and typically have a porosity in the range from 50 to 90%. They are used in customary forms, for example as disks, as filter modules, as filter candles (customarily as cylinders having a surface area increased by pleating) or in any other known form.

The filtration through a fiber filter can be carried out before or after the distillation, and before or after the filtration through carbon. Preferably, it is carried out before the distillation. Furthermore, it is carried out in a preferred manner after the carbon filtration. In a very particularly preferred embodiment of the present invention, sodium hydroxide solution or potassium hydroxide solution, a methanolic solution of sodium methoxide or potassium methoxide or an ethanolic solution of sodium ethoxide or potassium ethoxide is firstly filtered through a carbon filter, then through a filter of inert fiber material, and then freed of mercury by passing into a distillation column, together with an additional amount of the solvent, preferably the solution to be purified, preferably at the column top, removal of solvent by distillation and stripping off of the purified liquor or alkoxide solution at the column bottom.

It is also possible to carry out the filtration steps repeatedly or to combine them in any desired manner. For example, it is possible to filter repeatedly through carbon, repeatedly through fiber material, or repeatedly through carbon and fiber material. The actual embodiment and sequence of individual filtration steps is a routine task of the person skilled in the art, who solves this according to the stream to be treated, its impurity content and the requirements of the depletion.

Using the process described, a very simple depletion of mercury to the values achievable by use of amalgamating noble metals is possible, i.e. to at most 3 ppb, without the disadvantages of the amalgamating noble metals having to be expected.

EXAMPLES

Example 1

An edge filter was coated with a 2 to 3 mm thick carbon layer by depositing a suspension of electrode graphite (mean particle size 300 micrometers, BET surface area 1.1 m$^2$/g) in methanol. At a temperature of 70-80° C., a mercury-polluted methanolic sodium methoxide solution (27% by weight) was filtered at a flow rate of 12-15 liters per 100 cm2 filter area per hour. The solution running off was then added to the top of a continuously operated tunnel plate column together with 20 liters of methanol per 100 liters of sodium methoxide solution. Sufficient methanol was removed by distillation such that at the column bottom a 30% strength by weight sodium methoxide solution was obtained.

Before and after filtration, and after the distillation, 4 samples in each case were taken and analyzed for their mercury content. The results are shown in the following table.

| Before filtration [ppm] | After filtration [ppm] | After distillation [ppb] |
|---|---|---|
| 23 | 3.3 | 20 |
| 21 | 4.3 | 10 |
| 18 | 3.3 | 14 |
| 17 | 3.1 | 12 |

The values show that using the distillation process according to the invention degrees of mercury depletion of markedly more than 100 are achieved and thus despite use of a relatively coarse filter carbon and using an only two-stage process even lower mercury contents are achieved than with the process of DE 197 04 889, in which the solution contaminated with mercury is introduced into a distillation still and only the solvent is stripped off.

Example 2

A carbon filtration was carried out with a 27% by weight sodium methoxide solution as in example 1. The methoxide solution was then diluted with methanol in the ratio 5:1 and filtered through a disk filter module having a filter layer of a mixture of cellulose fibers with kieselguhr having pore widths in the range of 2 to 5 micrometers. The solution was then added to the top of a continuously operated tunnel plate column without further dilution. Sufficient methanol was distilled off such that a 30% strength by weight sodium methoxide solution was obtained at the column bottom.

Before and after filtration, and after the distillation, 5 samples in each case were taken and analyzed for their mercury content. The results are shown in the following table.

| Before filtration [ppm] | After carbon filtration [ppm] | After filtration through fiber material and distillation [ppb] |
|---|---|---|
| 18 | 2.3 | 1-2 |
| 19 | 3.5 | 2 |
| 19 | 2.9 | 1 |
| 19 | 2.3 | 2 |
| >100 | 1.8 | <1 |

Example 3

A carbon filtration was carried out using a 27% strength by weight sodium methoxide solution as in example 1. The methoxide solution was then diluted with methanol in the ratio 5:1.1 and filtered through a candle filter module using filter candles of polypropylene fiber nonwoven. The candles were loaded at 460 to 560 l/h, based on a filter element having a 10 inch length. The solution was then added to the top of a continuously operated tunnel plate column without further dilution. Sufficient methanol was distilled off such that a 30% strength by weight sodium methoxide solution was obtained at the column bottom.

Before and after filtration, and after distillation, 2 samples in each case were removed and analyzed for their mercury content. The results are shown in the following table.

| Before filtration [ppm] | After carbon filtration [ppm] | After filtration through fiber material and distillation [ppb] |
|---|---|---|
| 10.8 | 3.6 | 1 |
| 13.8 | 4.2 | 1 |

Examples 1 and 2 show that using the distillation process according to the invention mercury can be depleted down to the lowest ppb range with an outlay comparable to previously known processes.

We claim:

1. A process for the removal of mercury from an alkali solution or an alcoholic alkali metal alkoxide solution contaminated with mercury, wherein the alkali solution or alcoholic alkali metal alkoxide solution contaminated with mercury is first filtered through carbon, then filtered through an inert fiber material and then the alkali solution or the alcoholic alkali metal alkoxide solution is distilled wherein the distillation comprises introducing the solution into a distillation column above the column bottom, distilling off water or alcohol and removing the alkali solution or alcoholic alkali metal alkoxide solution depleted in mercury at the column bottom.

2. A process as claimed in claim 1, wherein apart from the alkali solution or alcoholic alkali metal alkoxide solution contaminated with mercury, additional solvent is introduced into the column.

3. A process as claimed in claim 2, wherein the alkali solution or alcoholic alkali metal alkoxide solution contaminated with mercury and additional solvent is introduced into the column in a volume ratio in the range from 30:1 to 1:3.

4. A process as claimed in claim 1, wherein the alkali solution or alcoholic alkali metal alkoxide solution contaminated with mercury is introduced at the column top.

* * * * *